United States Patent [19]
Luzi

[11] 3,942,737
[45] Mar. 9, 1976

[54] DOWNRIGGER FOR FISHING

[76] Inventor: Mark V. Luzi, 11224 W. Grange Ave., Hales Corners, Wis. 53130

[22] Filed: Dec. 6, 1974

[21] Appl. No.: 530,163

[52] U.S. Cl............ 242/107.1; 114/235 B; 242/106
[51] Int. Cl.²......................................... B65H 75/48
[58] Field of Search............. 254/175.3, 184, 186 R; 114/235 B, 235 WS; 242/211, 220, 86.5 A, 86.5 R, 84.2 R, 101, 107.1, 107.13; 226/188

[56] References Cited
UNITED STATES PATENTS

| | | | |
|---|---|---|---|
| 1,276,825 | 8/1918 | Swope | 242/107.1 |
| 3,071,099 | 1/1963 | Cutlan | 254/184 |
| 3,147,935 | 9/1964 | Wilson | 114/235 WS |
| 3,195,831 | 7/1965 | Shriner et al. | 114/235 WS |
| 3,614,016 | 10/1971 | Rieth | 242/106 |
| 3,719,331 | 3/1973 | Harsch | 242/86.5 R |
| 3,785,079 | 1/1974 | Rohn | 242/106 |
| 3,844,058 | 10/1974 | King | 242/106 |

Primary Examiner—Robert J. Spar
Assistant Examiner—Kenneth Noland
Attorney, Agent, or Firm—Ralph G. Hohenfeldt

[57] ABSTRACT

Two equal sized sheaves, each having a crank handle, are journaled for independent rotation. A sinker weight is supported on the loop of a control cable whose ends are attached to the respective sheaves. The control cable extends tangentially from the bottom of one sheave and the top of the other. Rotating the sheaves in the same direction transfers control line from one sheave to another without raising the sinker. Rotating the sheaves in opposite directions simultaneously or in sequence raises and lowers the sinker depending on the selected directions of rotation. A fishing tackle line which is attachable to the control cable may thereby be raised and lowered independently of the sinker weight.

18 Claims, 6 Drawing Figures

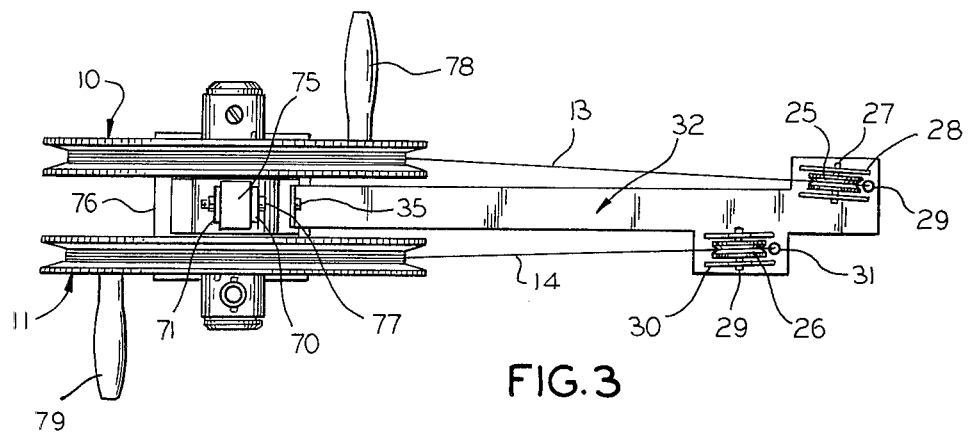
FIG. 3
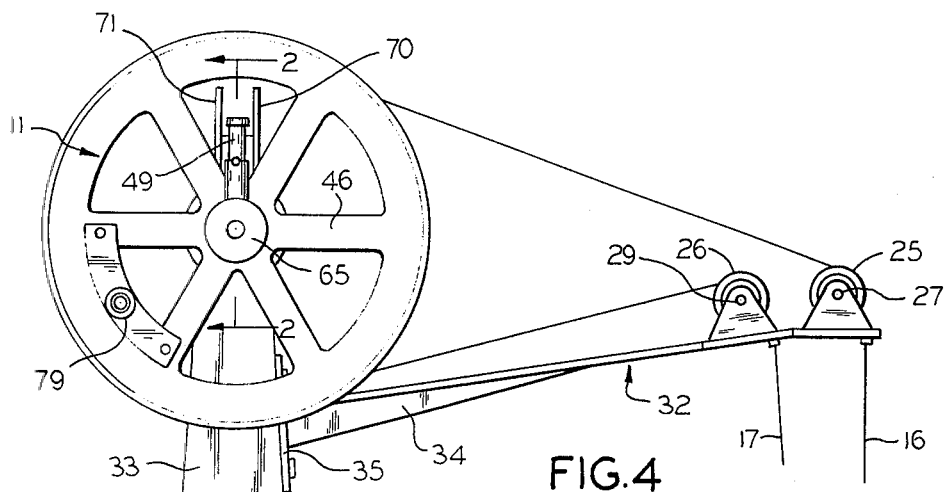
FIG. 4
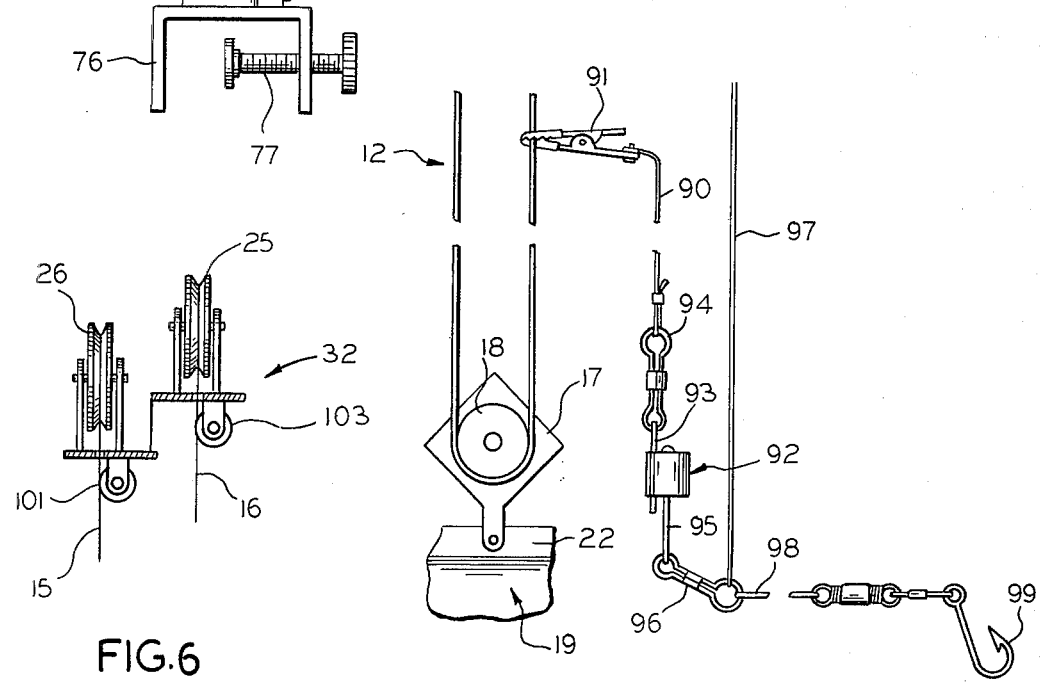
FIG. 6
FIG. 5

DOWNRIGGER FOR FISHING

BACKGROUND OF THE INVENTION

When trolling for fish in deep water it is customary to use a control cable or line to lower a heavy weight or sinker to the approximate depth at which fishing is desired. Before lowering the weight, a short clip line is attached to the control cable near the weight or to the weight itself. A tackle line for the fisherman's rod and reel is attached to the clip line with a separable connector and the leader to the hook and bait is held with the connector. When the fishing boat is in motion the weight holds the bait at the selected depth. When a fish strikes, the connector separates so landing of the fish can be accomplished solely with the tackle line.

One disadvantage of this prior practice is that after a fish is landed or at any time that rebaiting or inspecting the bait is desired, it is necessary to raise the sinker to the level of the boat. Usually this is done by cranking the control line onto a drum or reel mounted on the boat using manual effort or an electric motor. Since fishing at depths of 50 to 150 feet or more with weights of about 15 pounds is not uncommon, it is evident that considerable energy must be expended in raising and lowering the sinker.

Using an electric motor to drive each downrigger on a single boat avoids the physical stress of manual operation, but electric motor drives create other problems. The electric motors are usually supplied from batteries aboard the boat. When there are several fisherman aboard or when the weights are raised frequently to check the condition of the bait or to remove fish, a heavy current drain is imposed on the batteries and they may become depleted and incapable of supplying the boat engine and the downrigger motors.

When doing deep water trolling, the sinker weight occasionally snags or catches on the bottom of the body of water. If detachment of the sinker cannot be accomplished by maneuvering its control cable, the cable must be cut at above water level so that the weight and a substantial part of the cable is lost.

SUMMARY OF THE INVENTION

A general object of the present invention is to provide a downrigger which overcomes the aforementioned and other known disadvantages of prior art downriggers.

Another object is to provide a downrigger in connection with which the sinker may be carried on a loop of a control cable in a translatable fashion so that the tackle line which is detachably fastened to the control cable, may be taken in or lowered by simply translating the control cable without changing the elevation of the sinker.

Still another object of the invention is to avoid loss of the control cable when the sinker weight becomes snagged by means which permit detaching the cable from a windup wheel and translating it through a pulley on the sinker weight, thereby recovering substantially all of the control cable even though the weight may be lost.

Other objects of the invention are to provide a downrigger which is easy to operate and inexpensive, considering its capabilities, and that permits convenient fishing from the stern or the side of a boat.

In general terms, an illustrative embodiment of the invention comprises a stand that has a bearing. A shaft is journaled in the bearing. There are two large sheaves for handling the control line. One of the sheaves is fixed on the shaft on one side of the bearing stand. The other sheave is journaled for rotation on the shaft on the other side of the bearing stand. The control line, which is preferably a steel cable has one end fastened to one sheave and its other end fastened to the other sheave. The cable ends are disposed on each of the sheaves in such manner that if the sheaves are turned in the same direction, cable will unwind or feed from one and will be taken up on the other sheave. This means, when the shaft is horizontal, that one end portion of the cable will make tangential contact with one sheave above the rotational axis and the other end portion of the cable will make tangential contact with the other sheave below the rotational axis. The continuous cable running from sheave to sheave may be extended to form a loop. The sinker is provided with a pulley by means of which the sinker is supported in the cable loop. The portions of the cable extending from the large sheaves to form the loop are further guided on individual small sheaves that are supported on an arm which is radially remote from the large sheaves. The two small sheaves, in one embodiment, maintain the plane of the cable legs extending down to the loop in the plane of travel of the boat on which the downrigger is mounted. The large sheaves are each provided with crank handles to enable turning them in the same or reverse directions. When the sheaves are turned simultaneously in the same direction, cable transfers from one sheave to the other by virtue of it translating through the pulley which supports the sinker and the elevation of the sinker in the water does not change. The large sheaves may be turned individually or sequentially in opposite directions to feed out or take up cable and thereby lower or raise the sinker.

A more detailed description of the new downrigger and its use in connection with deep water fishing will now be set forth in reference to the drawings. Further objects of the invention, besides those indicated above will also be evident in the ensuing detailed description of a preferred embodiment of the invention.

DESCRIPTION OF THE DRAWINGS

FIG. 3 is a plan view of the downrigger;

FIG. 4 is a side elevation view of the downrigger;

FIG. 5 is a partial view of the sinker supported in the cable loop and associated with fishing tackle with which the downrigger cooperates; and FIG. 6 is a modification of a downrigger which is adapted for fishing from the side as opposed to fishing from the stern of the boat.

DESCRIPTION OF A PREFERRED EMBODIMENT

Figure 1:
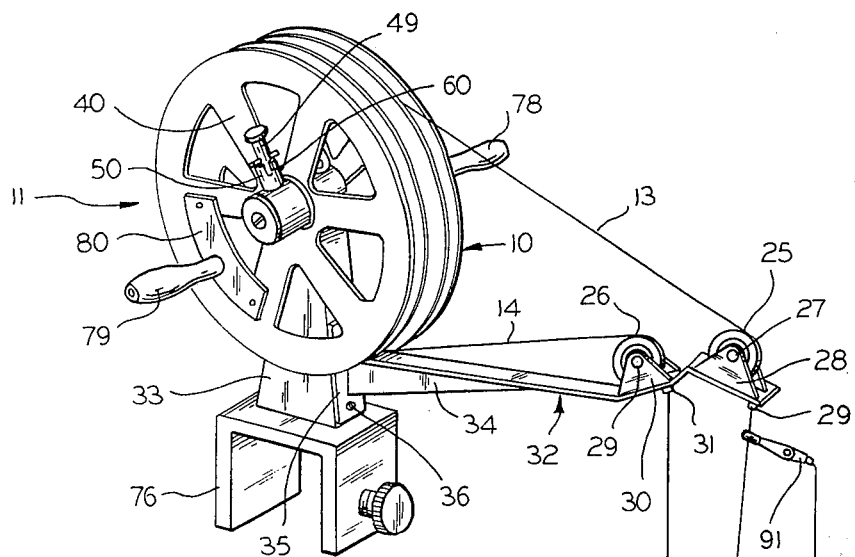
FIG. 1 is a perspective view of the downrigger.

The downrigger shown in FIG. 1 comprises a first large sheave 10 and a second similar sheave 11 mounted for rotation about a normally horizontal axis. The sheaves are rotatable manually. A continuous control cable 12 has one of its end portions 13 wound onto sheave 10 and another of its end portions 14 wound onto sheave 11. The extreme ends of the cable are fastened to the periphery of the sheaves, respectively. The control cable is wound on the sheaves such that the end portion 13 makes tangential contact with the periphery of sheave 10 at its top and above its rotational axis. End portion 14 of the control cable makes tangential contact with the periphery of sheave 11 at its bottom and below its rotational axis.

As shown in FIG. 1, cable 12 has two downwardly extending portions 15 and 16 which form a loop in the region of a sheave assembly 17. The sheave in assembly 17 can be seen in FIG. 5 where it is marked 18. Sheave assembly 17 is fastened to a sinker 19 with the bolt 20. The illustrated sinker 19 comprises a fusiform shaped body 21 which has a normally vertically oriented fin 22. Body 21 is preferably made of lead and fin 22 is preferably made of a stiffer metal such as steel. Fin 22 may be molded in or otherwise secured to body 21.

Sinker 19 may be variously shaped. For instance, it may be a lead ball to which sheave assembly 17 is suitably attached. The illustrated configuration of the sinker 19, however, is streamlined such that fin 22 will guide it in the line of travel of the fishing boat on which the downrigger is mounted during trolling. Moreover, the stability of sinker 19 afforded by fin 22 when the sinker is being pulled through the water contributes toward maintaining downwardly extending cable portions 15 and 16 in alignment or in a vertical plane directed along the line of travel of the boat. In other words, twisting of downwardly extending cable portions 15 and 16 is inhibited.

Note that cable portions 13 and 14 extend tangentially from large sheaves 10 and 11 and that their directions are changed from generally horizontal to generally vertical by a pair of small sheaves 25 and 26 over which cable 12 runs. As can be seen in FIGS. 1 and 3, sheave 25 is rotatable on a shaft 27 that is mounted in a bracket 28. The base of the bracket has a hole 29 through which the downwardly directed cable passes. The other sheave 26 is on a shaft 29 mounted in a bracket 30 which has a hole 31 to enable the cable to be directed downwardly after it passes over small sheave 26. The two sheave brackets 28 and 30 are supported on the end of an arm 32 that extends away from a bearing stand or support 33. Arm 32 may comprise a flat member and a web 34 welded or cast thereon to impart rigidity to the arm. The arm has a base 35 for fastening it to the side of bearing stand 33 by any suitable means such as with cap screws 36.

Note in FIG. 3, particularly, that cable direction changing small sheave 25 is substantially aligned with large cable takeup and feed sheave 10 and that small sheave 26 is substantially aligned with the other cable takeup and feed sheave 11. Sheave 25 is also more distant from large sheave 10 than small sheave 26 is from large sheave 11.

Figure 2:
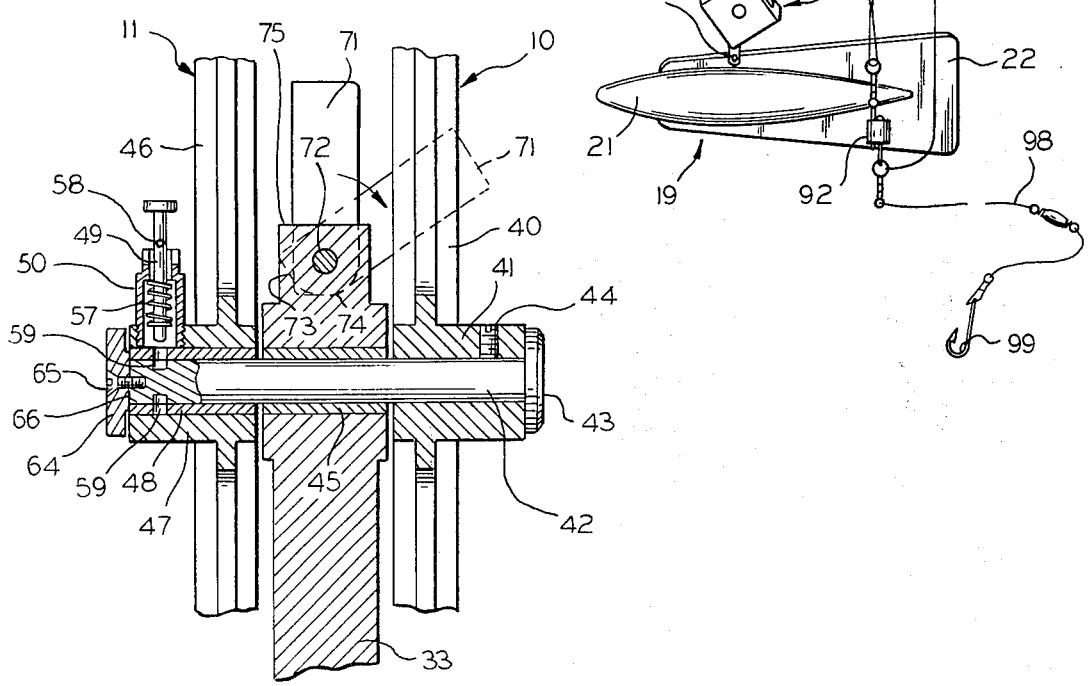
FIG. 2 is a partial vertical section taken on a line corresponding with 2-2 in FIG. 4.

FIG. 2 shows how the large sheaves 10 and 11 are mounted. Sheave 10 has several spokes 40 which join with a central hub 41. A shaft 42 having an integral head 43 extends through hub 41. Hub 41 and, hence, sheave 10 are fixed on shaft 42 for rotation therewith by any suitable keying means such as one or more set screws 44. Bearing stand or support 33 preferably has a bushing 45 in which shaft 42 is journaled for rotation.

The other large sheave 11 has several spokes 46 joined to a central hub 47 in which there is a bushing 48 such that sheave 11 is selectively rotatable with respect to shaft 42.

Sheave 11 is selectively engageable and disengageable for independent and joint rotation, respectively, with shaft 42. A detent pin 49 is provided for engaging and disengaging sheave 11 with respect to shaft 42. Detent pin 49 is in a tube 50 which is screwed radially into hub 47. There is a spring 51 in the tube which reacts against a cross pin 58 extending through detent pin 49. Shaft 42 has several radial holes 59 of sufficient size to receive the tip of detent pin 49. Detent tube 50 has a cross slot 60, as can be seen in FIG. 1, to enable retracting the detent and giving it a 90° turn to keep its tip out of engagement with the holes 59 in bushing 48 and shaft 42. When the detent is turned oppositely such that pin 58 can enter slot 60, spring 51 drives the detent 49 into engagement with shaft 42 such that sheave 11 cannot turn thereon but will jointly turn with shaft 42 and the other sheave 10. The sheaves are restrained on opposite sides of bearing stand 43 by means of a retainer disk 64 which has a flat head screw 65 for fastening it into the end of shaft 42 as is clearly evident in FIG. 2. Retainer disk 64 has an axially extending boss 66 slightly smaller than the bore of bushing to provide for a little free play in the shaft.

Means are also provided for locking either or both of the large sheaves 10 and 11 against rotation. As can be seen in FIGS. 2–4, illustrative locking means comprise a pair of pivotally mounted arms 70 and 71 on a pivot pin 72. The pin is through a prism shaped upwardly projecting portion 75 of bearing stand 33. Arm 71 is swingable on pivot pin 72 such that the arm can enter between spokes 40 of large sheave 10 to restrict its rotation. Arm 70 is swingable in the other direction such that it may enter between spokes 46 of large sheave 11 and prevent its rotation. Arms 70 and 71 are similarly shaped in this example of the sheave locking means. Typically, arm 71 has a straight lower edge or end portion 73 and a curved corner 74. The curved corner permits the arm to swing in one direction as illustrated by its phantom line position in FIG. 2 where it is engaging with sheave 10. The straight edge 73 serves as a stop by reacting against bearing stand 33 so that arm 71 cannot turn counterclockwise beyond center position in which it is shown in solid lines in FIG. 2. As can be seen in FIG. 3, arms 70 and 71 are on opposite sides of the upstanding prism shaped projecting 75 of bearing stand 33. The locking means just described is only illustrative. For instance, the large sheaves 10 and 11 might be locked with slide bolts, not shown, that are mounted between large sheaves 10 and 11 on bearing stand 33 for movement in and out of the rotational path of sheaves 10 and 11.

Bearing stand 33 may be provided with a base for fastening the downrigger assembly at a convenient position relative to the deck of a boat. An illustrative mounting means is the inverted U-shaped clamping member 76 which is clearly visible in FIGS. 1 and 4. One of the sides of the member 76 is provided with a clamping screw 77 for securing the member to the boat such as to the gunwale on the stern whereupon arm 32 will extend over the rear of the boat in a direction opposite of the direction of the travel of the boat during trolling.

Large sheaves 10 and 11 each have a handle 78 and 79 for turning the large sheaves manually. As illustrated, the handles are mounted on pins supported in metal segments such as 80 which are fastened to the spokes of the sheaves.

Use of the downrigger in connection with trolling for fish will now be described primarily in reference to FIGS. 1 and 5. Initially sinker weight 19 is suspended above water level within the reach of the fisherman as may be assumed to be its position in FIG. 1. It will be understood that cable 12 is long enough to make many turns on large sheaves 10 and 11 when sinker weight 19 is raised. Typically, control cable 12 may be at least three times as long as the maximum depth at which the sinker is to be placed and sheaves 10 and 11 may have a diameter of about 10 inches, for example, but can be larger or smaller. A control cable 12 of its length would permit fishing at an approximate depth of 150 feet. In any case, the maximum depth permissible is about one-third the total length of the cable. After sinker 19 is lowered into the water as will be explained, a leader line 90 is attached to cable 12 by means of an alligator clip 91. At one end of leader 90 there is a detachable connector body 92 which may be made of fibrous material. Connector 92 receives a pin 93 that fits frictionally into a hole in the bottom of the connector. Pin 93 is held with a clasp 94 attached to leader 90. Another pin 95 having an eye connected to a double-eyed clasp 96 is fixed in connector 92. The tackle line 97 extending up to the rod and reel, not shown, of the fisherman on a boat engages with clasp 96. Extending from the clasp is a bait leader line 98 which terminates in a fishhook 99 on which a live bait may be attached and, of course, other types of lures might also be substituted for live bait and hook 99. When a fish strikes the bait, connector 92 is pulled off of pin 93 so that the fish may be landed by taking in tackle line 97 independently of sinker weight 19 and of control cable 12.

The downrigger may be operated in different modes but typically fishing is initiated by first lowering the sinker 19 without alligator clip 91 and the tackle line 97 being attached to control cable 12. Prior to lowering the sinker 19 to the approximate depth at which fishing is desired, and assuming maximum depth is desired, two-thirds of cable 12 may be wound onto one large sheave such as sheave 11 and one-third on sheave 10. Then, as viewed in FIG. 1, sheave 10 may be held with manual handle 78 and sheave 11 may be rotated counterclockwise, while detent 19 is disengaged from shaft 42, so the portion 15 of cable 12 extends and sinker 19 translates thereon downwardly by virtue of it being engaged by small pulley 18 in the loop of cable 12. The sinker can be lowered under these circumstances to a maximum depth equal to half the length of the cable on sheave 11 originally. Sheave 10 is also independently rotatable when the detent is retracted such that if part of the cable 12 is on sheave 10 initially, the latter may be turned to cause the cable to extend and lower the sinker. Of course, sheave 10, when feeding out cable, is turned in a direction opposite to that in which sheave 11 is turned when cable is being fed out and the sinker is being lowered. This is because the cable is wound on the respective sheaves in different directions.

Assuming that the sinker has been lowered to the desired depth, the next step is to get the bait down the approximate depth at which fishing is desired. This is accomplished by attaching alligator clip 91 to the downwardly extending portion, such as outboard portion 16 of cable 12 beyond small sheave 25 as illustrated in FIG. 1. Now to move the alligator clip for the tackle line toward the sinker 19, the fisherman engages sheave 11 with shaft 42 by inserting detent 49 in which case sheaves 10 and 11 are locked together for joint rotation. In reference to FIG. 1, sheaves 10 and 11 are then turned clockwise by the fisherman engaging either or both handles 78 and 79 in which case cable 12 is fed from sheave 10 and an equal amount is simultaneously taken up on sheave 11. The alligator clip and, hence, the bait may be lowered to any depth limited only by the sinker depth. In this case, sinker 19 remains at whatever level it was set since cable 12 merely translates relative to sinker 19 by virtue of the cable passing over pulley 18 on the sinker.

When a fish bites and is landed with tackle line 97 independently of the sinker as described above, the line with the alligator clip 91 must be brought up to rebait the tackle line. The alligator clip and its attachments may also be brought up when the fisherman desires to inspect the condition of the bait. Under these circumstances, large sheaves 10 and 11 are interlocked with detent 49 and the sheaves are turned jointly counterclockwise as viewed in FIG. 1 in this example. This transfers cable from sheave 11 to sheave 10 such that the alligator clip 91 is brought up but the cable translates through the sinker and it remains at whatever level it has been set.

Whenever it is desired to hold sinker 19 at a fixed level, locking means 70 and 71 may be engaged with the respective sheaves 10 and 11 to prevent their rotation. Of course, since the weight of the sinker is equalized on both portions of the cable leading from each large sheave, the sheaves tend to be held in equilibrium if they are locked together because of substantially equal tension on both portions of the cable.

When it is desired to terminate fishing, sheaves 10 and 11, which are then locked together for joint rotation, are rotated in a suitable direction for bringing up the alligator clip 91 and it is detached. This frees the tackle line. After that, sheave 11 is disengaged from shaft 42 so that each of the sheaves 10 and 11 can be turned independently. They are then turned jointly or consecutively in opposite directions to take in the cable and lift sinker 19.

Another operational sequence for lowering the sinker and the tackle line and for raising them independently as desired is to start with all of the cable 12 prewound onto large sheave 10 in reference to FIG. 1. Then while holding large sheave 11, sheave 10 is turned clockwise to feed out cable and extend intermediate cable portion 16 to lower the sinker. The sinker will descend a distance equal to one-half the amount of cable that is fed out from sheave 10. The two large sheaves may then be locked by pivoting locking levers 70 and 71 after which alligator clip 91 and associated tackle line 97 may be fastened to descending portion 16 of cable 12 as shown in FIG. 1. Locks 70 and 71 are then released and detent 29 is inserted to interlock the two large sheaves 10 and 11 for joint rotation. The two sheaves 10 and 11 are then rotated clockwise as viewed in FIG. 1 so that additional cable is fed from sheave 10 and simultaneously taken up on sheave 11 while the cable feeds through or translates with respect to sinker pulley 18 so the sinker 19 depth remains constant. Locking members 70 and 71 may then be set again while trolling for fish proceeds. The procedure for raising either the sinker or tackle line or both should be self-evident from the foregoing and from the previous description of one mode of operation so the procedure will not be repeated.

Of course, many other operational sequences are obtainable as governed by the amount of control cable available, the amounts on each of the sheaves 10 and 11 at a given time and the depths at which the sinker and tackle line and bait are desired to be placed.

The amount of cable fed out or taken in by rotation of large sheaves 10 and 11 may be determined by simply counting the number of sheave rotations. Each rotation feeds or takes in about the same number of lineal feet of cable even though the axial widths of grooves in the sheaves are narrow such that the cable piles up or overlays and produces an effective change in sheave diameter. It has been found that a calibration chart or scale, not shown, is useful. The scale is based on experimentally determining the relation between the number of turns of a sheave and the lineal feet of cable. In this way non-linearity between the two for several check points can be recorded and the chart or scale may be affiliated with the downrigger for use by its operator when more accuracy is required.

As mentioned earlier, the common mode of fishing is to have the downrigger mounted on the stern of the boat with arm 32 which supports the small sheaves 25 and 26 extended rearwardly in a direction opposite to that in which the boat is expected to travel. In such case, the planes of large sheaves 10 and 11 are parallel to or coincident with the line of travel of the boat. The axis of shaft 42 is transverse to the line of travel. The downrigger may also be adapted for fishing off the side of the boat in which case arm 32 would extend transversely and the axis of shaft 42 would be directed in the line of travel. Motion of the boat would cause fin 22 to turn the sinker in the water such that the downwardly extending portions 15 and 16 of the cable might twist with each other. To avoid this and to make fishing from the side of the boat more convenient, the downrigger may be modified as depicted in FIG. 6.

In FIG. 6, the outboard end of arm 32 is provided with a first additional bracket mounted sheave 101 cooperating with sheave 26 and a second additional sheave 103 cooperating with sheave 25. These sheaves may be part of a standard model and not used for stern fishing or they may be incorporated in a special model adapted for fishing from the side of the boat. The axis of small sheave 101 is normal to the axis of sheave 26 so that the cable bears on the periphery of the small sheave. Similarly, sheave 103 directs the cable at a right angle to sheave 25. This disposes the downwardly extending portions 15 and 16 of cable 12 in alignment with each other and in a plane which coincides with the line of travel of the boat. Thus, sinker 19 can be trolled from the side of the boat with its fin 22 in the line of travel without downwardly extending portions 15 and 16 of cable 12 twisting.

In the foregoing description of the invention, the term "cable" has been used to designate the control line. A small cross section flexible cable comprised of steel strands has been found to work satisfactorily but it should be understood that any suitable line made of other materials and having high strength in comparison with its cross section can be used. A long length of cable has the merit of being somewhat elastic so that when the sinker is jerked due to changes in boat speed or to dragging on the bottom, the shock will be largely absorbed by the elastic cable.

The large sheaves 10 and 11 are essentially wheels having a periphery for accommodating cable. Thus, the term "wheel" and "wheel means" are intended to be generic to such equivalent devices as cable drums and reels.

Although a preferred embodiment of the invention has been described in considerable detail, such description is intended to be illustrative rather than limiting, for the invention may be variously embodied and is to be limited only by interpretation of the claims which follow.

I claim:
1. A downrigger adapted to operate a cable for selectively raising and lowering a sinker means and for selectively feeding and taking up said cable independently of substantial movement of said sinker means, comprising:
   a. first and second reversibly rotatable wheel means constructed and arranged for engaging opposite end portions of a continuous cable for suspending said sinker means translatably on a loop portion of said cable formed intermediate its ends,
   b. means for rotating said wheel means individually and jointly, rotation of said wheel means individually and jointly in first opposed directions causing said cable to be fed from one and the other of said wheel means to extend said intermediate portion of said cable between said end portions for lowering said sinker means on said loop portion, and rotation of said wheel means individually and jointly in second opposed reverse directions causing said cable to be taken up on one and the other of said wheel means for raising said sinker means on said loop portion,
   c. rotation of said first and second wheel means jointly in a selected direction causing said cable to be fed from one wheel means and to be taken up by the other wheel means for said cable to translate relative to said sinker to thereby maintain the distance of said sinker from said wheel means substantially constant.
2. The downrigger of claim 1 wherein:
   a. said wheel means are coaxial.
3. The downrigger of claim 1 including:
   a. means for selectively coupling and uncoupling one wheel means relative to the other for said joint and individual rotation of said wheel means, respectively.
4. The downrigger of claim 1 wherein:
   a. said sinker has pulley means journaled for rotation thereon, said cable loop portion running on said pulley means for translating said cable relative to said sinker and for supporting said sinker.
5. The downrigger of claim 1 wherein said means for rotating said wheel means includes manually engageable handle means on each of said wheel means for selectively rotating said wheel means individually and jointly.
6. A downrigger adapted to operate a cable for selectively raising and lowering a sinker means and for selectively feeding and taking up said cable independently of substantial movement of said sinker means, comprising:
   a. first and second reversibly rotatable wheel means arranged for rotation about the same axis, each of said wheel means having means for engaging opposite end portions of a continuous cable such that an intermediate portion of said cable may form a loop portion between said first and second wheel means for suspending said sinker means in a manner that permits said cable to translate relative to said sinker means,
   b. means for rotating said wheel means jointly and individually, and means for selectively coupling and uncoupling said first and second wheel means for enabling joint and individual rotation, respectively, of said wheel means,
   c. rotation of said wheel means jointly in the same direction causing said cable to be fed from one of said wheel means and to be taken up correspondingly by the other of said wheel means while said cable including said loop portion translates relative to said sinker means for enabling said sinker means to remain at a substantially constant distance from said wheel means, d. rotation of said wheel means individually in first opposite directions simultaneously and sequentially causing said cable to be taken up by said wheel means to thereby raise said sinker means on said loop portion, and reversing said directions of rotation causing said cable to be fed from said wheel means to thereby lower said sinker means on said loop portion.

7. The downrigger in claim 6 wherein:
a. said axis of rotation of said wheel means is substantially horizontal and said reversibly rotatable wheel means rotate in substantially vertical planes,
b. said wheel means being arranged for said cable to extend from one of said wheel means tangentially of its periphery above said rotational axis and to extend from the other of said wheel means tangentially of its periphery below said axis.

8. The downrigger in claim 7 including:
a. a pair of sheave means and support means for supporting said sheave means for rotation at a place spaced from said wheel means, said sheave means being arranged for said cable extending from each of said wheel means to run over respective ones of said sheave means and to form in said intermediate cable portion a loop lying in a first vertical plane that is approximately parallel with the plane of said wheel means for suspending said sinker means.

9. The downrigger in claim 8 including:
a. additional sheave means mounted for rotation on said support means for said cable to run on and to cooperate with said first pair of sheave means for establishing said loop in a second vertical plane which is approximately perpendicular to said first plane.

10. A downrigger for operating a cable to raise and lower a sinker selectively and to feed and take up cable selectively independently of substantial movement of said sinker, comprising:
a. a shaft,
b. means for supporting said shaft for rotation,
c. first wheel means fixed on said shaft for rotation therewith,
d. second wheel means mounted for selective rotation on said shaft,
e. said wheel means being constructed and arranged for engaging with opposite end portions, respectively, of said cable such that an intermediate portion of said cable may form a loop between said first and second wheel means for supporting said sinker means translatably relative to said cable,
f. handle means on each of said wheel means for rotating said wheel means, and
g. means for selectively engaging and disengaging said second wheel means with said shaft, whereby when said means is engaged said wheel means are rotatable jointly to translate said cable relative to said sinker means and transfer said cable from one wheel means to another to thereby maintain the distance between said sinker means and wheel means substantially constant and when said second wheel means is disengaged both of said wheel means are rotatable in first opposite directions to extend said intermediate portion of said cable and in reversed opposite directions to take up said cable.

11. The downrigger in claim 10 including:
a. first and second sheave means,
b. means for supporting said sheave means for rotation remotely from said wheel means, the rotational axes of said sheave means, respectively, being substantially parallel to the axis of said wheel means,
c. said sheave means being arranged for cable leading from each wheel means to run on them, respectively, with said sinker supporting loop being formed between them.

12. The downrigger in claim 11 wherein said first sheave means is substantially in the vertical plane of said first wheel means and the second sheave means is substantially in the vertical plane of said second wheel means.

13. The downrigger in claim 12 wherein the point of tangency of said cable on one of said sheave means leading to said loop is farther from said wheel means than the point of tangency of said cable on the other of said sheave means leading to said loop, whereby intermediate portions of said cable forming said loop will be spaced from each other.

14. The downrigger in claim 11 including:
a. additional sheave means located near and cooperating with said first and second sheave means for changing the direction of said cable means to maintain said cable portions leading to said loop in a plane that is substantially transverse to the plane of said wheel means.

15. The downrigger in claim 12 including means for selectively locking one and the other and both of said wheel means against rotation and for selectively releasing the same for rotation.

16. A downrigger for fishing, comprising:
a. support means,
b. a shaft journaled for rotation on said support means, the axis of said shaft being nominally horizontally disposed,
c. first wheel means fixed on said shaft for rotation therewith on one side of said support means,
d. second wheel means mounted for rotation on said shaft on the other side of said support means,
e. said wheel means being rotatable in nominally vertical planes about said shaft axis and being constructed and arranged for winding and unwinding a cable,
f. means for selectively engaging and disengaging said second wheel means and said shaft for selective joint and individual rotation of said wheel means, respectively,
g. a cable having opposite end portions attached to said wheel means and having a continuous intermediate portion between said end portions,
h. said cable extending tangentially from generally opposite sides of the peripheries of said wheel means, respectively,
i. first and second sheave means supported for rotation in spaced relation from and in substantial alignment with said first and second wheel means, respectively, said cable running over said sheave means from each wheel means for forming a loop in said cable, j. pulley means for supporting a sinker, said pulley means being supportable in said cable loop, and k. handle means on said wheel means, respectively, for rotating said wheel means manually, whereby when said second wheel means is disengaged from said shaft means one and another of said wheel means may be rotated in first opposite directions to feed said cable from said wheel means for lowering said sinker and may be rotated in second opposite directions to take up said cable on said wheel means and when said wheel means are engaged and rotated in the same direction said cable will transfer from one wheel means to the other translatably relative to said sinker means.

17. A downrigger comprising:

a. first and second spaced apart coaxial wheel means, b. a bearing support between said wheel means, c. a shaft journaled in said bearing support, said first wheel means being fastened to said shaft and said second wheel means being rotatable thereon, d. means for selectively engaging and disengaging said second wheel means relative to said shaft to enable joint and individual rotation of said wheel means, respectively, e. a continuous cable having its opposite ends fastened to said wheel means, respectively, for being wound onto and fed from said wheel means, said cable being disposed on said wheel means such that joint rotation thereof in either direction will transfer cable from one wheel means to the other and individual simultaneous and sequential rotation thereof in first opposite directions will feed said cable and such rotation in reverse directions will take up said cable, f. first and second sheave means supported remotely from said wheel means for rotation in planes respectively parallel to said wheel means, respectively, said cable from each wheel means running on said sheave means for directing said cable vertically and for forming a loop in said cable, g. pulley means and a sinker supported thereon, said pulley means being supported in said cable loop for said cable to translate relative to said sinker upon said joint rotation of said wheel means and for said cable to raise and lower said sinker, selectively, upon said individual rotation of said wheel means, and h. handle means on said wheel means for turning said wheel means.

18. The downrigger of claim 17 including means for locking said first and second wheel means against rotation.

* * * * *